(12) United States Patent
Jing et al.

(10) Patent No.: US 11,755,567 B1
(45) Date of Patent: Sep. 12, 2023

(54) BLOCKCHAIN-BASED DATA VERIFICATION METHOD AND APPARATUS, DEVICE, AND STORAGE MEDIUM

(71) Applicant: BEIJING BAIDU NETCOM SCIENCE TECHNOLOGY CO., LTD., Beijing (CN)

(72) Inventors: Bo Jing, Beijing (CN); Hongyan Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/186,119

(22) Filed: Mar. 17, 2023

(30) Foreign Application Priority Data

Mar. 17, 2022 (CN) .......................... 202210260840.6

(51) Int. Cl.
*H04L 9/40* (2022.01)
*G06F 16/23* (2019.01)
(Continued)

(52) U.S. Cl.
CPC .......... *G06F 16/2379* (2019.01); *G06F 16/27* (2019.01); *H04L 9/3247* (2013.01); *H04L 9/50* (2022.05)

(58) Field of Classification Search
CPC ....... G06F 16/2379; G06F 16/27; H04L 9/50; H04L 9/3247
See application file for complete search history.

(56) References Cited

U.S. PATENT DOCUMENTS 11,538,036 B2 * 12/2022 Uhr ...................... G06Q 20/223
11,621,855 B2 * 4/2023 Lee ........................ H04L 9/3239
713/176

(Continued)

FOREIGN PATENT DOCUMENTS

CN 110781509 A 2/2020
CN 112054897 A 12/2020
(Continued)

OTHER PUBLICATIONS

First Chinese Office Action, issued from The State Intellectual Property Office of People's Republic of China, issued to CN Application No. 202210260840.6, dated Apr. 24, 2022, 3 pages.

(Continued)

*Primary Examiner* — Ghodrat Jamshidi
(74) *Attorney, Agent, or Firm* — HUNTON ANDREWS KURTH LLP

(57) ABSTRACT

Provided are a blockchain-based data verification method and apparatus, a device, and a storage medium, relating to the field of computer technology, for example, a blockchain technology, and applicable to cloud computing and cloud services. The solution includes acquiring a data verification transaction request initiated by a data owner; generating a response signature value in the current verification round according to the data verification transaction request; and sending the response signature value to a blockchain network. The response signature value is configured to instruct the blockchain network to verify whether the to-be-verified data block is stored in a data storer.

18 Claims, 9 Drawing Sheets

(51) Int. Cl.
*H04L 9/00*     (2022.01)
*H04L 9/32*     (2006.01)
*G06F 16/27*    (2019.01)

(56)           References Cited

U.S. PATENT DOCUMENTS

| | | |
|---|---|---|
| 2018/0351732 A1 | 12/2018 | Wang |
| 2019/0311116 A1* | 10/2019 | Li ............................. H04L 9/50 |
| 2020/0235911 A1* | 7/2020 | Safak .................... H04L 9/3247 |
| 2020/0244470 A1* | 7/2020 | Ruckriemen ......... H04L 9/3236 |
| 2020/0280444 A1* | 9/2020 | Tang ..................... H04L 9/3247 |
| 2020/0293514 A1* | 9/2020 | Rudek ................. G06F 21/6245 |
| 2021/0258141 A1* | 8/2021 | Moon ....................... H04L 9/50 |
| 2021/0279723 A1* | 9/2021 | Magerkurth .......... H04L 9/3236 |
| 2022/0150050 A1* | 5/2022 | Gundavelli ........... H04L 63/123 |

FOREIGN PATENT DOCUMENTS

| | | |
|---|---|---|
| CN | 113761585 A | 12/2021 |
| CN | 113935069 A | 1/2022 |

OTHER PUBLICATIONS

Notification to Grant Patent, issued from The State Intellectual Property Office of People's Republic of China, issued to CN Application No. 202210260840.6, dated May 3, 2022, 11 pages.

\* cited by examiner

BLOCKCHAIN-BASED DATA VERIFICATION METHOD AND APPARATUS, DEVICE, AND STORAGE MEDIUM

CROSS-REFERENCE TO RELATED APPLICATION

This application claims priority to Chinese Patent Application No. CN202210260840.6, filed on Mar. 17, 2022, the disclosure of which is incorporated herein by reference in its entirety.

TECHNICAL FIELD

The present disclosure relates to the field of computer technology, for example, a blockchain technology, and is applicable to cloud computing and cloud services.

BACKGROUND

As technology advances, massive private high-value data requires to be securely stored. A data owner faces great storage pressure and thus a storage service that enables data of the data owner to be stored using idle storage resources is required. It is vital to ensure that data of the data owner is actually stored in a data storer.

SUMMARY

The present disclosure provides a blockchain-based data verification method and apparatus, a device, and a storage medium.

According to one aspect of the present disclosure, a blockchain-based data verification method is provided. The method includes acquiring a data verification transaction request initiated by a data owner, where the data verification transaction request includes the current verification round, an auxiliary verification value corresponding to the current verification round, identification information of a to-be-verified data block corresponding to the current verification round, and a validity check value of the to-be-verified data block corresponding to the current verification round; generating a response signature value in the current verification round according to the data verification transaction request; and sending the response signature value to a blockchain network, where the response signature value is configured to instruct the blockchain network to verify whether a to-be-verified data block is stored in a data storer.

According to another aspect of the present disclosure, a blockchain-based data verification method is provided. The method includes, in response to determining that data verification is required, acquiring an auxiliary verification value corresponding to the current verification round; selecting a to-be-verified data block corresponding to the current verification round from associated data blocks of a target file allocated to a data storer; generating a validity check value of the to-be-verified data block; and initiating a data verification transaction request to a blockchain network. The data verification transaction request is configured to instruct the blockchain network to verify whether a to-be-verified data block is stored in the data storer. The data verification transaction request includes the current verification round, the auxiliary verification value corresponding to the current verification round, identification information of the to-be-verified data block corresponding to the current verification round, and the validity check value of the to-be-verified data block corresponding to the current verification round.

According to another aspect of the present disclosure, an electronic device is provided. The electronic device includes at least one processor; and a memory communicatively connected to the at least one processor.

The memory stores instructions executable by the at least one processor to enable the at least one processor to perform the blockchain-based data verification method according to any embodiment of the present disclosure.

According to another aspect of the present disclosure, a non-transitory computer-readable storage medium is provided. The storage medium stores computer instructions for enabling a computer to perform the blockchain-based data verification method according to any embodiment of the present disclosure.

The solution of the present disclosure enables an accurate verification of whether data of the data owner is actually stored in the data storer in the case where no data requires to provided.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be appreciated by those of ordinary skill in the art that various changes and modifications may be made to the embodiments herein without departing from the scope and spirit of the present disclosure. Similarly, description of well-known functions and constructions is omitted hereinafter for clarity and conciseness.

Figure 1:
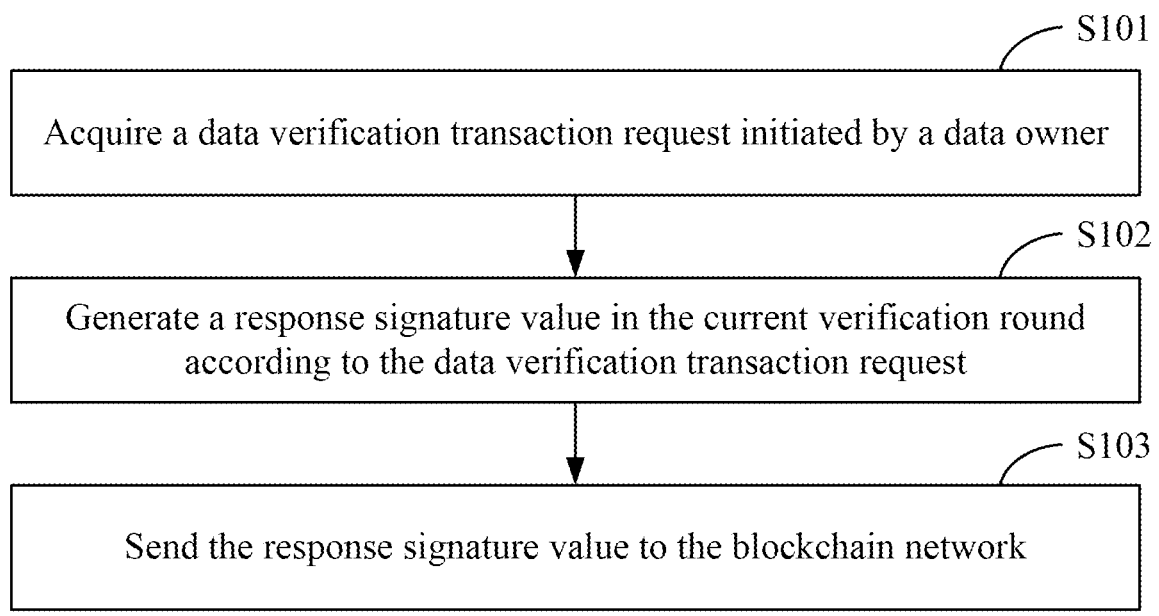
FIG. 1 is a flowchart of a blockchain-based data verification method according to an embodiment of the present disclosure.

FIG. 1 is a flowchart of a blockchain-based data verification method according to an embodiment of the present disclosure. This embodiment of the present disclosure is applicable to the case where data is verified based on the blockchain technology, for example, applicable to how to verify whether data of a data owner is stored in a data storer based on a bilinear mapping between a first point group and a second point group when the data owner has allocated at least two data blocks of a file to the data storer.

The bilinear mapping here is a function yielding a point in a third point group based on points in two point groups. This function is linear for each parameter. That is, if $e: V \times W \rightarrow X$ is a bilinear mapping, then a mapping from W to X is linear when V is fixed and W is variable, and a mapping from V to X is linear when W is fixed and V is variable. That is, in the bilinear mapping, when any one of the parameters is fixed, a mapping from the other of the parameters to X is linear. It is to be noted that in this embodiment, there are two point groups, any one of the two point groups may serve as the first point group, and the other of the two point groups may serve as the second point group.

Further, the bilinear mapping between the first point group and the second point group is a function yielding a point in a third point group based on points in the first point group and the second point group. This function is linear for each point in the first point group and the second point group. The first point group and the second point group are each a point group constructed using an elliptic curve. Further, the elliptic curve for construction of the first point group is different from the elliptic curve for construction of the second point group.

The blockchain-based data verification method is performed under the cooperation between the data owner, the data storer, and nodes in a blockchain network. The data owner is one that stores own data of the data owner in the data storer. The data storer is one that has rich storage resources, where the resources may be specially used for storing data. Further, nodes in the blockchain network can interact with the data owner and the data storer.

The blockchain-based data verification method according to this embodiment may be performed by the data storer. Optionally, the data storer may be a node in the blockchain network or may not be a node in the blockchain network. The method may be performed by a blockchain-based data verification apparatus. The apparatus may be implemented in software and/or hardware and may be integrated in a computing device of the data storer.

It is to be noted that the data owner may initiate multiple rounds of verification to ensure that data of the data owner is actually stored in the data storer. Each time the data owner initiates a round of verification (that is, a data verification transaction request), the data storer generates a response signature value corresponding to this round. The process of generating a response signature value corresponding to each verification round may be implemented as below.

As shown in FIG. 1, the blockchain-based data verification method according to this embodiment may include the process below.

In S101, a data verification transaction request initiated by a data owner is acquired.

In this embodiment, the data verification transaction request may be a request initiated by the data owner when data verification is required. For each verification round, the data owner initiates a data verification transaction request corresponding to this verification round according to a smart lease contract. The smart lease contract may be a code segment written according to a plug-in mechanism to deal with related matters such as data storage transactions between the data owner and the data storer.

Optionally, the data verification transaction request may include the current verification round, an auxiliary verification value corresponding to the current verification round, identification information of a to-be-verified data block corresponding to the current verification round, and a validity check value of the to-be-verified data block corresponding to the current verification round. It is to be noted that different verification rounds correspond to different auxiliary verification values, different identification information of the to-be-verified data block, and different validity check values of the to-be-verified data block.

The current verification round is a round of data verification transaction request currently initiated by the data owner. The auxiliary verification value is used for assisting in subsequent data verification. Different verification rounds correspond to different auxiliary verification values. Optionally, the auxiliary verification value corresponding to the current verification round may be generated based on the current verification round, a private key of the data owner, and a base point in the first point group.

Identification information of a data owner may be used for uniquely identifying the data owner. Identification information of a data owner may be, for example, the ID of the data owner. The data verification transaction request may also include identification information of the to-be-verified data block and a validity check value of the to-be-verified data block.

Identification information of the to-be-verified data block is used for uniquely identifying the to-be-verified data block. Identification information of the to-be-verified data block may be, for example, the serial number of the to-be-verified data block.

The validity check value may be a value or character string having a unique function. The validity check value is used for subsequent verification of whether a to-be-verified data block is stored in the data storer. Illustratively, the validity check value may be a random value that is randomly generated before the data owner initiates the data verification transaction request or may be generated after the smart contract is fulfilled. Optionally, validity check values are in one-to-one correspondence with to-be-verified data blocks, and the to-be-verified data block has unique identification information. That is, validity check values are in one-to-one correspondence with identification information. The validity check value is unique, including globally unique or locally unique.

Additionally, the data verification transaction request may also include identification information of at least one data storer of to-be-verified data blocks. Identification information of a data storer may be used for uniquely identifying the data storer. Identification information of a data storer may be, for example, the ID of the data owner. The data verification transaction request may include other information, for example, the data structure of the to-be-verified data block.

In this embodiment, if the data storer is not a node in the blockchain network, the data storer may acquire the data verification transaction request initiated by the data owner from a node that is located in the blockchain network and that interacts with the data storer.

If the data storer is a node in the blockchain network, the data storer may acquire the data verification transaction request initiated by the data owner from the blockchain network.

When the data owner requires data verification, the data owner may initiate the data verification transaction request corresponding to the current verification round to the data storer according to the smart lease contract, and then the data storer may acquire the data verification transaction request initiated by the data owner and respond to the request.

In S102, a response signature value in the current verification round is generated according to the data verification transaction request.

In this embodiment, the response signature value is the signature value of a response made by the data storer to the data verification transaction request. Optionally, one data verification transaction request corresponds to one response signature value.

Optionally, the response signature value in the current verification round may be generated according to the response signature value generation logic agreed in the smart lease contract and based on the current verification round, the auxiliary verification value corresponding to the current verification round, identification information of the to-be-verified data block corresponding to the current verification round, and the validity check value of the to-be-verified data block corresponding to the current verification round. For example, a hash operation is performed on the current verification round, the auxiliary verification value corresponding to the current verification round, identification information of the to-be-verified data block corresponding to the current verification round, and the validity check value of the to-be-verified data block corresponding to the current verification round so that the response signature value in the current verification round is obtained.

In S103, the response signature value is sent to the blockchain network.

The response signature value is configured to instruct the blockchain network to verify whether a to-be-verified data block is stored in the data storer.

The data storer sends the response signature value to the blockchain network. Accordingly, the blockchain network receives the response signature value and, based on the bilinear mapping between the first point group and the second point group and according to the current verification round, identification information corresponding to the current verification round, the validity check value corresponding to the current verification round, the response signature value corresponding to the current verification round, and the public key of the data owner corresponding to the current verification round, verifies whether a to-be-verified data block is stored in the data storer. The response signature value belongs to the first point group. The public key of the data owner belongs to the second point group.

The solution according to this embodiment of the present disclosure includes acquiring a data verification transaction request initiated by a data owner; generating a response signature value according to the data verification transaction request; and sending the response signature value to the blockchain network. The data verification transaction request includes the current verification round, an auxiliary verification value corresponding to the current verification round, identification information of the to-be-verified data block corresponding to the current verification round, and a validity check value of the to-be-verified data block corresponding to the current verification round. The response signature value is configured to instruct the blockchain network to verify whether a to-be-verified data block is stored in the data storer. In this solution, a more valid response signature value can be generated according to a verification round and an auxiliary verification value corresponding to the verification round in a scenario of verification based on a bilinear mapping. Therefore, the verification result is more reliable. Moreover, this solution enables an accurate verification of whether data of the data owner is actually stored in the data storer in the case where no data requires to be provided.

Figure 2:
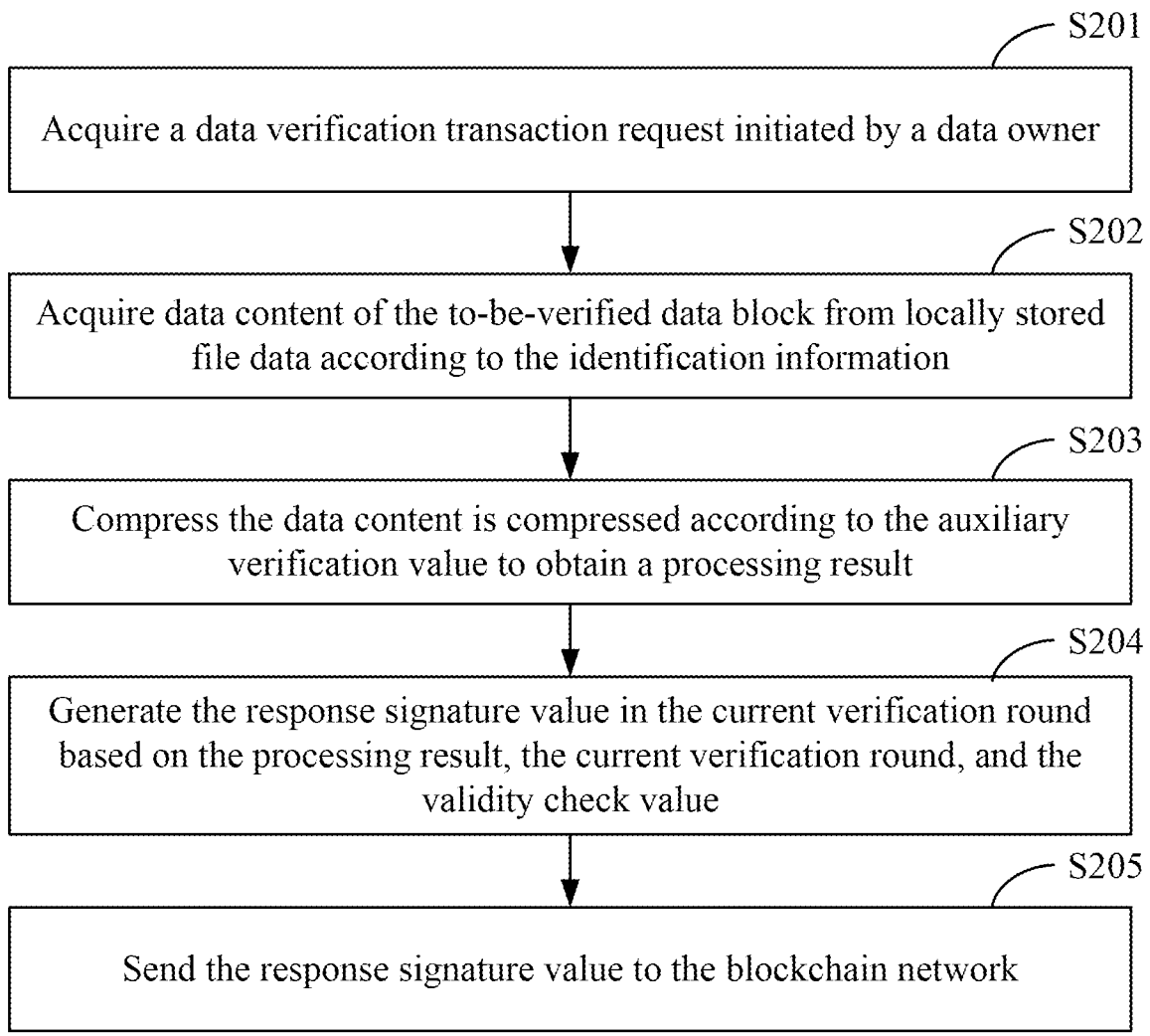
FIG. 2 is a flowchart of another blockchain-based data verification method according to an embodiment of the present disclosure.

FIG. 2 is a flowchart of another blockchain-based data verification method according to an embodiment of the present disclosure. Based on the previous embodiment, this embodiment is an alternative embodiment that includes an improvement on "a response signature value in the current verification round is generated according to the data verification transaction request". As shown in FIG. 2, the blockchain-based data verification method according to this embodiment may include the process below.

In S201, a data verification transaction request initiated by a data owner is acquired.

In S202, data content of the to-be-verified data block is acquired from locally stored file data according to the identification information.

The locally stored file data is searched for the to-be-verified data block and data content of the to-be-verified data block by using identification information of the to-be-verified data block corresponding to the current verification round as an index.

In S203, the data content is compressed according to the auxiliary verification value so that a processing result is obtained.

Optionally, it is feasible to compress the data content according to the auxiliary verification value, in a data content processing manner specified in the response signature value generation logic agreed in the smart lease contract, to obtain the processing result. For example, data content of the to-be-verified data block is processed so that a value is obtained; and the auxiliary verification value and the obtained value are input to a set function so that the processing result is obtained.

Alternatively, it is feasible to compress the auxiliary verification value and the data content, by using a set data compression algorithm, to obtain the processing result.

In S204, the response signature value in the current verification round is generated based on the processing result, the current verification round, and the validity check value.

In an alternative embodiment, the response signature value in the current verification round may be generated based on the current verification round, the processing result, and the validity check value according to the response signature value generation logic agreed in the smart lease contract. For example, a hash operation is performed on the current verification round, the processing result, and the validity check value so that the response signature value in the current verification round is obtained.

In S205, the response signature value is sent to the blockchain network.

The response signature value is configured to instruct the blockchain network to verify whether a to-be-verified data block is stored in the data storer.

The data storer sends the response signature value to the blockchain network. Accordingly, the blockchain network receives the response signature value and, based on the bilinear mapping between the first point group and the second point group and according to the current verification round, identification information corresponding to the current verification round, the validity check value corresponding to the current verification round, the response signature value corresponding to the current verification round, and the public key of the data owner corresponding to the current verification round, verifies whether a to-be-verified data block is stored in the data storer. The response signature value belongs to the first point group. The public key of the data owner belongs to the second point group.

It is to be noted that in the related art, $m_{sj}*g1=(m_{sj} \mod N)*g1$ on an elliptic curve group G1 when a large file is stored in a scenario based on an elliptic bilinear mapping. Here $m_{sj}$ denotes data content of the s-th to-be-verified data block at the j-th time, and N denotes the order of G1 (that is, the total number of points in the first point group). Therefore, if the size of $m_{sj}$ exceeds N, it is all right for the data storer to actually stores $m_{sj} \mod N$ without actually storing $m_{sj}$. In this case, the data storer is still able to provide a valid storage and retention proof and complete a zero-knowledge proof challenge. That is, there is a distinct storage loophole, making it impossible to prove that data of the data owner is stored in the data storer.

Whereas in the present disclosure, the concept of verification round is introduced, a corresponding variable rj (that is, an auxiliary verification value) is introduced for each verification round, and the data storer compresses data content of a data block according to the introduced variable rj, thereby reducing the data amount of the data block, avoiding a storage loophole that occurs when the size of the data block exceeds the order of the first point group, and thus allowing a valid storage and retention proof to be still provided for a large file.

The solution according to this embodiment of the present disclosure includes acquiring a data verification transaction request initiated by a data owner; acquiring data content of the to-be-verified data block from locally stored file data according to the identification information; compressing the data content according to the auxiliary verification value to obtain a processing result; generating the response signature value in the current verification round based on the processing result, the current verification round, and the validity check value; and sending the response signature value to the blockchain network. The response signature value is configured to instruct the blockchain network to verify whether a to-be-verified data block is stored in the data storer. In this solution, a more valid response signature value can be generated according to a verification round and an auxiliary verification value corresponding to the verification round in a scenario of verification based on a bilinear mapping, regardless of whether or not the size of the data block exceeds the order of the first point group, thereby avoiding a storage loophole and ensuring the reliability of the verification result. Moreover, this solution enables an accurate verification of whether data of the data owner is actually stored in the data storer in the case where no data requires to be provided.

Based on the previous embodiment, in an alternative embodiment of the present disclosure, acquiring the data content of the to-be-verified data block from the locally stored file data according to the identification information includes determining the start position of file data to which the to-be-verified data block belongs; determining the initial position of the to-be-verified data block according to the identification information, a data offset, and the start position; and acquiring the data content of the to-be-verified data block from the locally stored file data according to the initial position.

The start position of file data to which the to-be-verified data block belongs refers to the start position of file data of the data owner in the storage space of the data storer. The data offset refers to the length of bytes that each data block occupies when stored. The initial position of the to-be-verified data block refers to the initial position (including the start position and the end position) of the to-be-verified data block in the storage space of the data storer.

File data to which the to-be-verified data block belongs may be determined based on identification information of the data owner, and then the start position of the file data may be determined from the locally stored file data according to identification information of the file data.

After the start position of file data to which the to-be-verified data block belongs is determined, identification information of the to-be-verified data block subtracted by 1, multiplied by the data offset, and then added to the start position may be used as the start position of the to-be-verified data block. Also, identification information of the to-be-verified data block multiplied by the data offset and then added to the start position may be used as the end position of the to-be-verified data block.

After the initial position of the to-be-verified data block is determined, data content of the to-be-verified data block may be acquired from the storage space of the data storer according to the initial position.

It is to be understood that the initial position of the to-be-verified data block can be quickly positioned according to identification information of the to-be-verified data block, the data offset, and the start position of file data to which the to-be-verified data block belongs, providing data support for fast and accurate acquisition of data content of the to-be-verified data block.

Based on the previous embodiment, in an alternative embodiment of the present disclosure, compressing the data content according to the auxiliary verification value to obtain the processing result includes performing a hash operation on the data content and the auxiliary verification value to obtain a first hash value; and determining the processing result according to the first hash value.

For each to-be-verified data block, data content of the each to-be-verified data block may be processed so that a value is obtained; and then a hash operation may be performed on the auxiliary verification value and the value obtained based on the data content. For example, the auxiliary verification value and the value obtained based on the data content may be spliced, and a hash operation may be performed on the splicing result so that a first hash value is obtained; and the first hash value may be used as the processing result of the each to-be-verified data block.

It is to be understood that the operation of performing a hash operation on the data content and the auxiliary verification value reduces the data amount of the data block.

Figure 3:
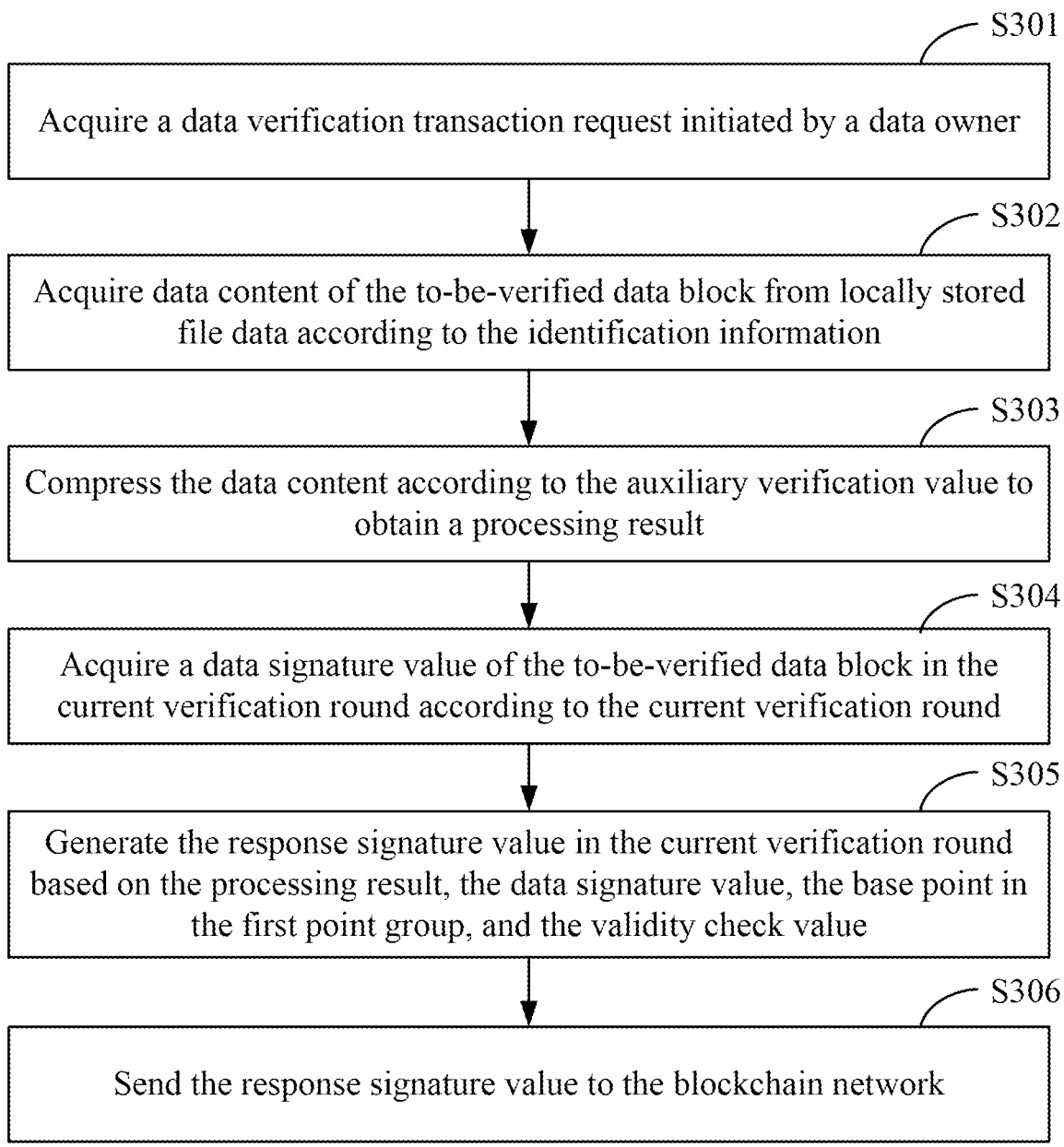
FIG. 3 is a flowchart of another blockchain-based data verification method according to an embodiment of the present disclosure.

FIG. 3 is a flowchart of another blockchain-based data verification method according to an embodiment of the present disclosure. Based on the previous embodiment, this embodiment is an alternative embodiment that includes an improvement on "a response signature value is generated according to the data verification transaction request". As shown in FIG. 3, the blockchain-based data verification method according to this embodiment may include the process below.

In S301, a data verification transaction request initiated by a data owner is acquired.

In S302, data content of the to-be-verified data block is acquired from locally stored file data according to the identification information.

In S303, the data content is compressed according to the auxiliary verification value so that a processing result is obtained.

In S304, a data signature value of the to-be-verified data block in the current verification round is acquired according to the current verification round.

The data signature value of the to-be-verified data block in the current verification round may be acquired according to the current verification round and a prestored association between data blocks, verification rounds, and data signature values when data content of the to-be-verified data block is acquired.

In S305, the response signature value in the current verification round is generated based on the processing result, the data signature value, the base point in the first point group, and the validity check value.

The base point in the first point group is a generator of the first point group. Other points in the first point group may be generated based on the base point.

In an embodiment, a data processing result, the data signature value, the base point in the first point group, and the validity check value may be input to a signature value calculation model, and the response signature value may be output by the signature value calculation model.

In another embodiment, the response signature value may be generated based on the data processing result, the data signature value, the base point in the first point group, and the validity check value according to a set formula or a set rule.

In S306, the response signature value is sent to the blockchain network.

The response signature value is configured to instruct the blockchain network to verify, according to the data verification transaction request and the response signature value and based on the bilinear mapping between the first point group and the second point group, whether a to-be-verified data block is stored in the data storer.

The solution according to this embodiment of the present disclosure includes acquiring a data verification transaction request initiated by a data owner; acquiring data content of the to-be-verified data block from locally stored file data according to the identification information; compressing the data content according to the auxiliary verification value to obtain a processing result; acquiring a data signature value of the to-be-verified data block in the current verification round according to the current verification round; generating the response signature value in the current verification round based on the processing result, the data signature value, the base point in the first point group, and the validity check value; and sending the response signature value to the blockchain network. In this solution, a correspondence between verification rounds and data signature values is introduced so that a unique valid data signature value can be determined for each verification round, ensuring that a reliable verification result can be obtained subsequently.

Figure 4:
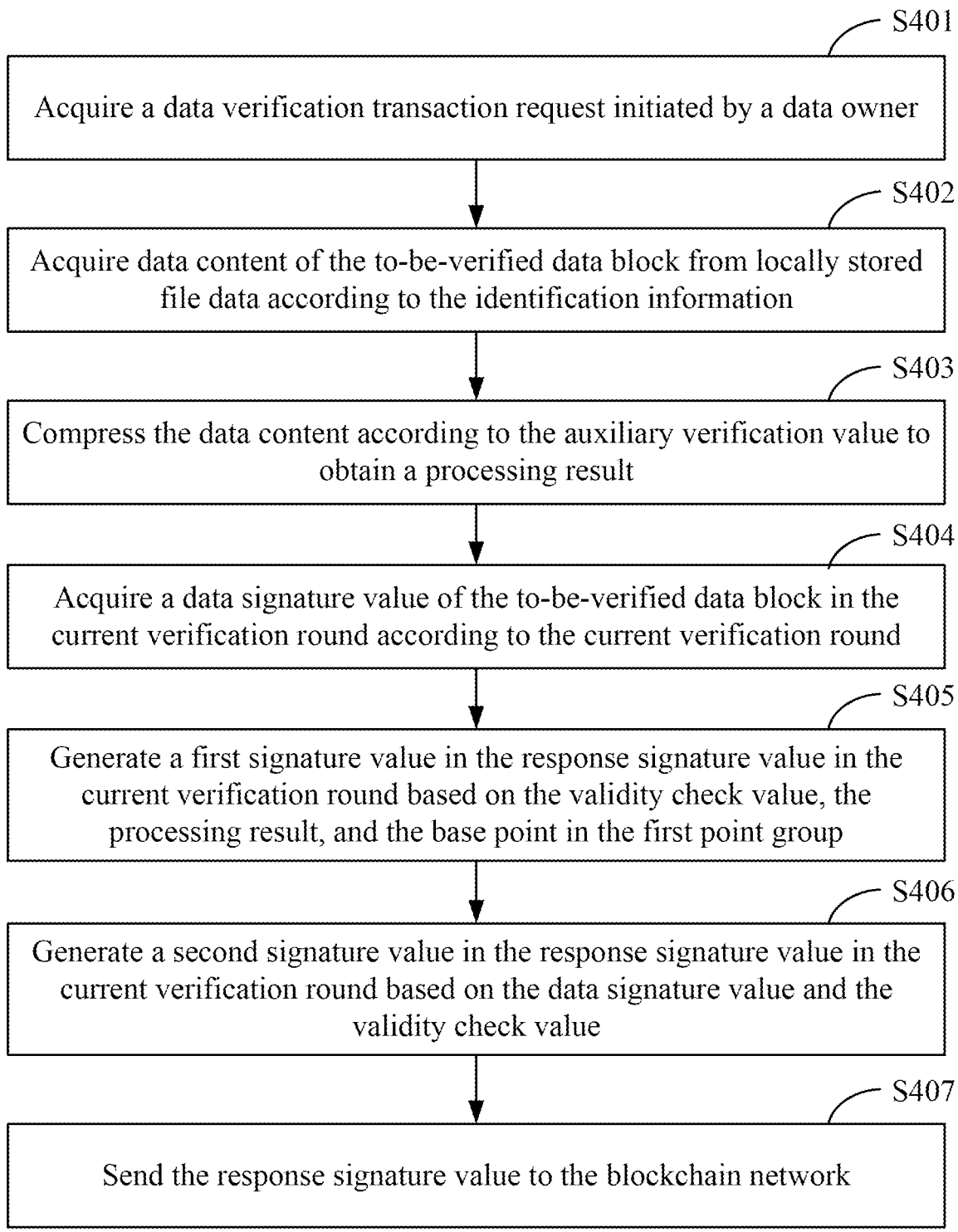
FIG. 4 is a flowchart of another blockchain-based data verification method according to an embodiment of the present disclosure.

FIG. 4 is a flowchart of another blockchain-based data verification method according to an embodiment of the present disclosure. Based on the previous embodiment, this embodiment is an alternative embodiment that includes an improvement on "a response signature value is generated based on the data content, the data signature value, the auxiliary verification value, the base point in the first point group, and the validity check value". As shown in FIG. 4, the blockchain-based data verification method according to this embodiment may include the process below.

In S401, a data verification transaction request initiated by a data owner is acquired.

In S402, data content of the to-be-verified data block is acquired from locally stored file data according to the identification information.

In S403, the data content is compressed according to the auxiliary verification value so that a processing result is obtained.

In S404, a data signature value of the to-be-verified data block in the current verification round is acquired according to the current verification round.

In S405, a first signature value in the response signature value in the current verification round is generated based on the validity check value, the processing result, and the base point in the first point group.

In an embodiment, the validity check value, the processing result, and the base point in the first point group may be input to a first signature value calculation model, and the first signature value may be output by the first signature value calculation model.

In another embodiment, the response signature value may be generated based on the validity check value, the processing result, and the base point in the first point group according to a set formula or a set rule. For example, for each to-be-verified data block, the product of the processing result corresponding to the each to-be-verified data block and the validity check value of the each to-be-verified data block is calculated; and the sum of products corresponding to all to-be-verified data blocks is multiplied by the base point in the first point group. The result of the multiplication is used as the first signature value in the response signature value.

In S406, a second signature value in the response signature value in the current verification round is generated based on the data signature value and the validity check value.

For each to-be-verified data block, the product of the data signature value of the each to-be-verified data block in the current verification round and the validity check value of the each to-be-verified data block in the current verification round is calculated, and the sum of products corresponding to all to-be-verified data blocks is used as the second signature value in the response signature value.

In S407, the response signature value is sent to the blockchain network.

The response signature value is configured to instruct the blockchain network to verify, according to the data verification transaction request and the response signature value and based on the bilinear mapping between the first point group and the second point group, whether a to-be-verified data block is stored in the data storer.

The solution according to this embodiment of the present disclosure includes acquiring a data verification transaction request initiated by a data owner; acquiring data content of the to-be-verified data block from locally stored file data according to the identification information; compressing the data content according to the auxiliary verification value to obtain a processing result; acquiring a data signature value of the to-be-verified data block in the current verification round according to the current verification round; generating a first signature value in the response signature value in the current verification round based on the validity check value, the processing result, and the base point in the first point group; generating a second signature value in the response signature value in the current verification round based on the data signature value and the validity check value; and sending the response signature value to the blockchain network. This solution provides a calculation method of the response signature value, improving the validity of the response signature value and thus laying a foundation for the blockchain network to subsequently verify whether data of the data owner is actually stored in the data storer in the case where no data requires to be provided.

Figure 5:
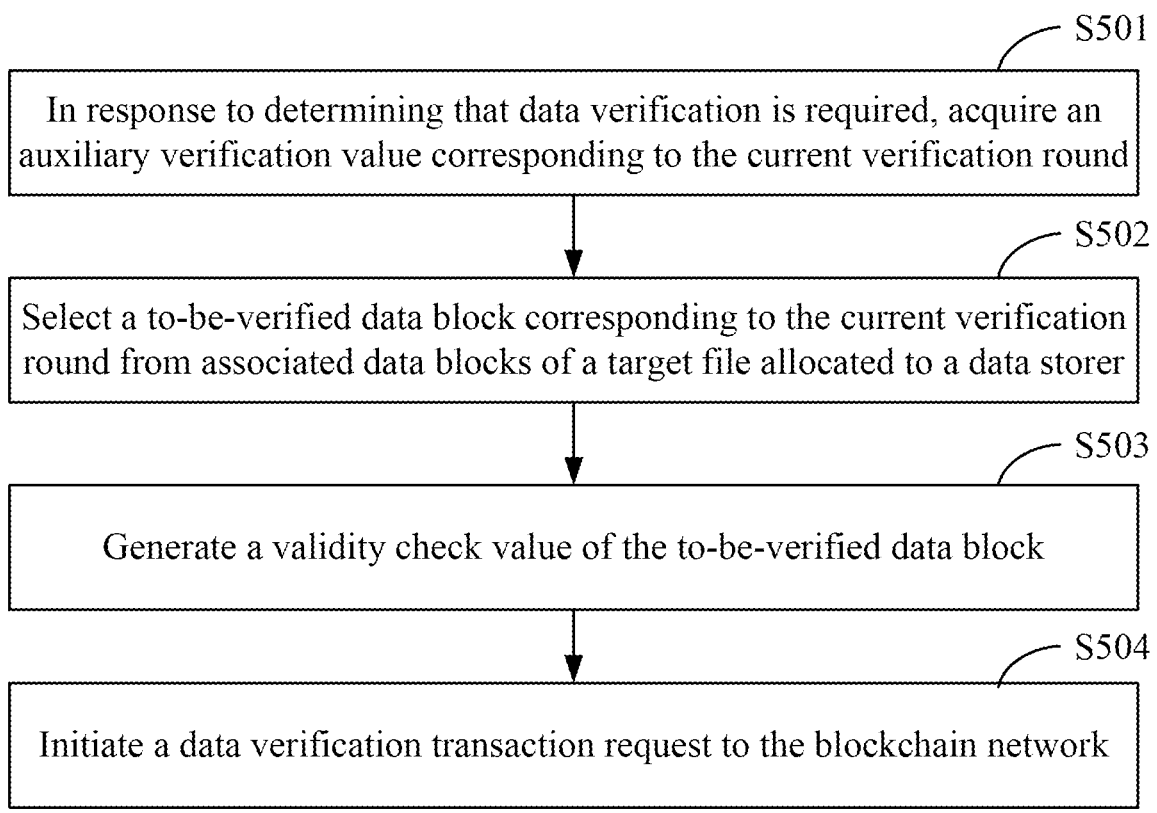
FIG. 5 is a flowchart of another blockchain-based data verification method according to an embodiment of the present disclosure.

FIG. 5 is a flowchart of another blockchain-based data verification method according to an embodiment of the present disclosure. This embodiment of the present disclosure is applicable to the case where data is verified based on the blockchain technology, for example, applicable to how to verify whether data of a data owner is stored in a data storer. The blockchain-based data verification method is performed under the cooperation between the data owner, the data storer, and a node in a blockchain network.

The blockchain-based data verification method according to this embodiment may be performed by the data owner. Optionally, the data owner may be a node in the blockchain network or may not be a node in the blockchain network. The method may be performed by a blockchain-based data verification apparatus. The apparatus may be implemented in software and/or hardware and may be integrated in a computing device of the data owner. As shown in FIG. 5, the blockchain-based data verification method according to this embodiment may include the process below.

In S501, in response to determining that data verification is required, an auxiliary verification value corresponding to the current verification round is acquired.

In this embodiment, the auxiliary verification value may be pregenerated, and auxiliary verification values are in one-to-one correspondence with verification rounds. It is to be noted that the verification round may also be preset. For example, the number of verification rounds of certain data may be set to 10. Further, a verification time may be set for each verification round, that is, different rounds of data verification are performed at different set times. Then, verification times, verification rounds, and auxiliary verification values are associated with each other and stored locally.

In an alternative embodiment, in response to determining that data verification is required, the auxiliary verification value corresponding to the current round is determined based on the current verification time. For example, according to the current verification time and an association between verification times, verification rounds, and auxiliary verification values, the verification round corresponding to the current verification time may be acquired locally, that is, the current verification round may be acquired locally, and then the auxiliary verification value corresponding to the current verification round may be acquired locally.

In an alternative embodiment, in response to determining that data verification is required, the auxiliary verification value corresponding to the current verification round may be determined based on the latest verification round among the historical verification rounds. For example, the current verification round is obtained by adding 1 to the latest verification round among the historical verification rounds. Then the auxiliary verification value corresponding to the current verification round is acquired.

In S502, a to-be-verified data block corresponding to the current verification round is selected from associated data blocks of a target file allocated to a data storer.

In this embodiment, the target file refers to to-be-stored file data that has been allocated to the data storer. Further, the target file is split into at least two data blocks before being allocated to the data storer.

When the data owner requires data verification, one or more data blocks may be randomly selected from at least two data blocks of the target file that has been allocated to the data storer, and the selected one or more data blocks are used as to-be-verified data blocks.

In S503, a validity check value of the to-be-verified data block is generated.

Optionally, the validity check value is a random value that is less than the order of a first point group.

For each to-be-verified data block, a value is randomly generated to serve as the validity check value of the each to-be-verified data block, or a value is generated by fulfilment of a smart contract to serve as the validity check value of the each to-be-verified data block.

In S504, a data verification transaction request is initiated to the blockchain network.

The data owner may initiate a data verification transaction request to the blockchain network according to a smart lease contract.

Further, a node in the blockchain network acquires the data verification transaction request of the data owner and responds. The node in the blockchain network may verify, based on a bilinear mapping between the first point group and a second point group and according to the data verification transaction request and the response signature value of the response made by the data storer to the data verification transaction request, whether a to-be-verified data block is stored in the data storer. The data verification transaction request includes the current verification round, the auxiliary verification value corresponding to the current verification round, identification information of the to-be-verified data block corresponding to the current verification round, and the validity check value of the to-be-verified data block corresponding to the current verification round.

The solution according to this embodiment of the present disclosure includes, in response to determining that data verification is required, acquiring an auxiliary verification value corresponding to the current verification round; selecting a to-be-verified data block corresponding to the current verification round from associated data blocks of a target file allocated to a data storer; generating a validity check value of the to-be-verified data block; and initiating a data verification transaction request to the blockchain network. In this solution, when it is required to verify whether data is stored in the data storer, the data owner can perform verification based on the blockchain network after providing the blockchain network with only the auxiliary verification value corresponding to the current verification round, identification information of the to-be-verified data block corresponding to the current verification round, and the validity check value of the to-be-verified data block corresponding to the current verification round without providing the to-be-verified data block, ensuring the data privacy; and a verification round and the auxiliary verification value corresponding to the verification round are introduced, ensuring an effective verification of whether data is stored in the data storer.

Based on the previous embodiment, in an alternative embodiment of the present disclosure, acquiring the auxiliary verification value corresponding to the current verification round includes generating the auxiliary verification value corresponding to the current verification round based on the current verification round, a private key of the data owner, and a base point in the first point group.

The product of the current verification round, the private key of the data owner, and the base point in the first point group may be used as the auxiliary verification value corresponding to the current verification round.

Further, a result obtained by a unique hash operation on this product may be used as the auxiliary verification value corresponding to the current verification round. For example, the auxiliary verification value corresponding to the current verification round may be determined using the formula below.

$$r_j = H2(j * sk * g_1)$$

$r_j$ denotes the auxiliary verification value corresponding to the j-th verification round. j denotes the j-th verification round. sk denotes the private key of the data owner. $g_1$ denotes the base point in the first point group.

It is to be understood that the generation of an auxiliary verification value based on a verification round enables auxiliary verification values in different verification rounds to be different, thereby providing a guarantee for subsequent data verification.

Figure 6:
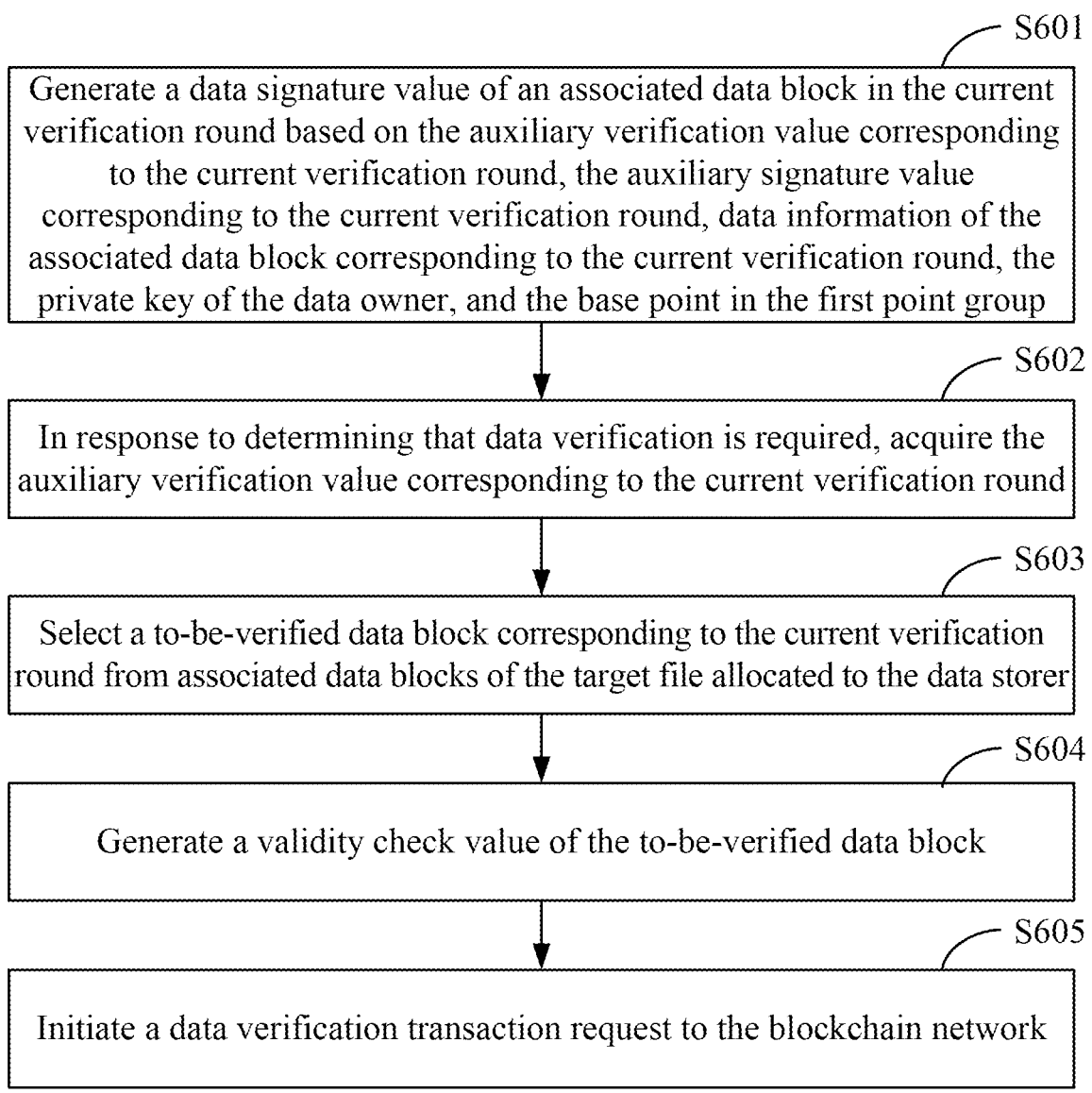
FIG. 6 is a flowchart of another blockchain-based data verification method according to an embodiment of the present disclosure.

FIG. 6 is a flowchart of another blockchain-based data verification method according to an embodiment of the present disclosure. This embodiment is an alternative embodiment that includes an improvement. As shown in FIG. 6, the blockchain-based data verification method according to this embodiment may include the process below.

In S601, a data signature value of an associated data block in the current verification round is generated based on the auxiliary verification value corresponding to the current verification round, the auxiliary signature value corresponding to the current verification round, data information of the associated data block corresponding to the current verification round, the private key of the data owner, and the base point in the first point group.

The auxiliary signature value refers to an auxiliary value used when the data owner signs the data block. Optionally, the auxiliary signature value may include a first auxiliary value and a second auxiliary value. Further, the first auxiliary value and the second auxiliary value may be different random values. Further, the first auxiliary value and the second auxiliary value are also less than the order of the first point group.

The associated data block in S601 is a data block of data blocks into which the data owner splits the target file. Data information of the associated data block includes, but is not limited to, identification information of the data block and data content of the data block. The data content is the content contained in the data block.

Optionally, the data signature value is a signature put to the associated data block by the data owner. Further, each associated data block corresponds to one data signature value in each different verification round, that is, each associated data block corresponds to one data signature set. Additionally, the data signature value belongs to the first point group.

In an embodiment, for each associated data block, the product of the auxiliary verification value corresponding to the current verification round, the auxiliary signature value corresponding to the current verification round, data information of the each associated data block corresponding to the current verification round, the private key of the data owner, and the base point in the first point group may be used as the data signature value of the each associated data block in the current verification round.

In S602, in response to determining that data verification is required, the auxiliary verification value corresponding to the current verification round is acquired.

In S603, a to-be-verified data block corresponding to the current verification round is selected from associated data blocks of the target file allocated to the data storer.

In S604, a validity check value of the to-be-verified data block is generated.

In S605, a data verification transaction request is initiated to the blockchain network.

The solution according to this embodiment of the present disclosure includes, in response to determining that data verification is required, acquiring an auxiliary verification value corresponding to the current verification round; selecting a to-be-verified data block corresponding to the current verification round from associated data blocks of a target file allocated to a data storer; generating a validity check value of the to-be-verified data block; initiating a data verification transaction request to the blockchain network; and generating a data signature value of an associated data block in the current verification round based on the auxiliary verification value corresponding to the current verification round, the auxiliary signature value corresponding to the current verification round, data information of the associated data block corresponding to the current verification round, the private key of the data owner, and the base point in the first point group. In this solution, the operation of generating a data signature value of an associated data block in the current verification round based on the auxiliary verification value corresponding to the current verification round, the auxiliary signature value corresponding to the current verification round, data information of the associated data block corresponding to the current verification round, the private key of the data owner, and the base point in the first point group lays a foundation for an effective verification of whether data of the data owner is actually stored in the data storer when no to-be-verified data block requires to be provided and no attention requires to be paid to the data size.

Based on the previous embodiment, in an alternative embodiment of the present disclosure, generating the data signature value of the associated data block in the current verification round based on the auxiliary verification value corresponding to the current verification round, the auxiliary signature value corresponding to the current verification round, the data information of the associated data block corresponding to the current verification round, the private key of the data owner, and the base point in the first point group includes generating a first value based on a first auxiliary value in the auxiliary signature value and identification information in the data information of the associated data block; generating a second value based on data content in the data information, a second auxiliary value in the auxiliary signature value, the auxiliary verification value corresponding to the current verification round, and the base point in the first point group; and generating the data signature value of the associated data block in the current verification round based on the private key of the data owner, the first value, and the second value.

For each associated data block, the sum of the first auxiliary value in the auxiliary signature value and identification information in the data information of the associated data block may be used as the first value. Alternatively, the product of the first auxiliary value in the auxiliary signature value and identification information in the data information of the associated data block may be used as the second value.

Further, a result obtained by a hash operation on the first auxiliary value in the auxiliary signature value and identification information in the data information of the associated data block may be used as a third value. For example, a result obtained by a hash operation performed, using a unique hash function, on the first auxiliary value in the auxiliary signature value and identification information in the data information of the associated data block may be used as a third value.

Also, the sum of data content in the data information, the second auxiliary value in the auxiliary signature value, the auxiliary verification value corresponding to the current verification round, and the base point in the first point group may be used as the second value. Alternatively, data content in the data information may be processed so that a value is obtained, and the product of the obtained value, the second auxiliary value in the auxiliary signature value, the auxiliary verification value corresponding to the current verification round, and the base point in the first point group may be used as the second value.

After the first value and the second value are determined, the sum of the first value and the second value may be calculated, and the product of this sum and the private key of the data owner may be used as the data signature value of the associated data block in the current verification round.

It is to be understood that this embodiment is an alternative embodiment in which the first value and the second value are introduced for the data signature value of the associated data block in the current verification round.

Illustratively, generating the second value based on data content in the data information, the second auxiliary value in the auxiliary signature value, the auxiliary verification value corresponding to the current verification round, and the base point in the first point group includes performing a hash operation on the auxiliary verification value corresponding to the current verification round and data content in the data information to obtain a second hash value; and generating the second value based on the second hash value, the second auxiliary value in the auxiliary signature value, and the base point in the first point group.

The auxiliary verification value corresponding to the current verification round and data content in the data information are spliced, and a hash operation is performed on the splicing result so that a second hash value is obtained. The product of the second hash value, the second auxiliary value in the auxiliary signature value, and the base point in the first point group is used as the second value.

It is to be understood that the hash operation on the auxiliary verification value corresponding to the current verification round and data content in the data information avoids the problem in which the order of the obtained second value exceeds the order of the first point group when the data content is too large, thereby providing a guarantee for subsequent data verification.

Further, based on the previous embodiment, the data signature value of the associated data block in the current verification round may be determined using the formula below.

$$\sigma_{ji} = sk*(H(v\|i) + \text{DoubleSHA256}(m_i\|r_j))*u*g_1)$$

$\sigma_{ji}$ denotes the data signature value of the i-th associated data block in the j-th verification round. sk denotes the private key of the data owner. v denotes the first auxiliary value in the auxiliary signature value. i denotes identification information in data information of the associated data block. $m_i$ denotes data content in the data information. $r_j$ denotes the auxiliary verification value corresponding to the j-th verification round. u denotes the second auxiliary value in the auxiliary signature value. $g_1$ denotes the base point in the first point group.

Illustratively, in an alternative embodiment of the present disclosure, the associated data block and a data signature set of the associated data block may be allocated to the data storer. The data signature set includes data signature values of the associated data block in all verification rounds.

It is to be noted that in this embodiment, when the data block is sent to the data storer, the data signature value is sent together with the data block to the data storer. The sent data signature value is used for calculation of the response signature value when the data storer responds to the data verification transaction request of the data owner.

It is to be understood that the operation of allocating the associated data block and the data signature set of the associated data block to the data storer provides a basis for subsequent data verification.

Figure 7:
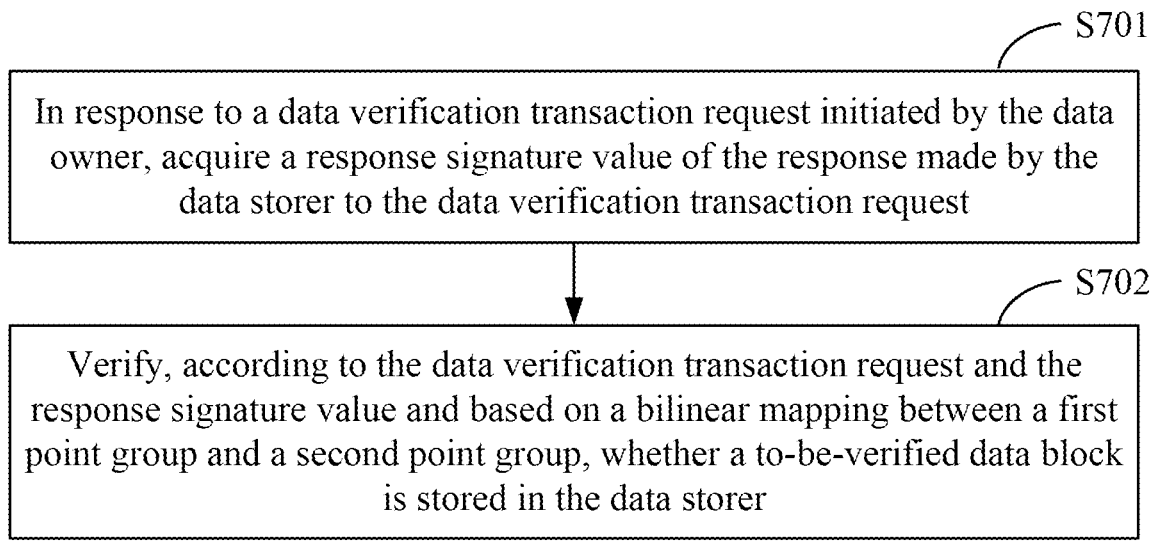
FIG. 7 is a flowchart of another blockchain-based data verification method according to an embodiment of the present disclosure.

FIG. 7 is a flowchart of another blockchain-based data verification method according to an embodiment of the present disclosure. This embodiment of the present disclosure is applicable to the case where data is verified based on the blockchain technology, for example, applicable to how to verify whether data of a data owner is stored in a data storer. The blockchain-based data verification method is performed under the cooperation between the data owner, the data storer, and nodes in a blockchain network.

The blockchain-based data verification method according to this embodiment may be performed by a node in the blockchain network, for example, a block generation node in the blockchain network. The method may be performed by a blockchain-based data verification apparatus. The apparatus may be implemented in software and/or hardware and may be integrated in a computing device of a blockchain node carrying a blockchain-based data verification function. As shown in FIG. 7, the blockchain-based data verification method according to this embodiment may include the process below.

In S701, in response to a data verification transaction request initiated by the data owner, a response signature value of the response made by the data storer to the data verification transaction request is acquired.

In this embodiment, the data verification transaction request includes the current verification round, an auxiliary verification value corresponding to the current verification round, identification information of a to-be-verified data block corresponding to the current verification round, and a validity check value of the to-be-verified data block corresponding to the current verification round. The response signature value is generated according to the data verification transaction request.

When the data owner requires data verification, the data owner may initiate a data verification transaction request to the blockchain network according to a smart lease contract. Then, the node in the blockchain network may acquire the data verification transaction request initiated by the data owner from the blockchain network and respond to the request. Meanwhile, the node may acquire the response signature value of the response made by the data storer to the data verification transaction request.

In an embodiment, if the data storer is not a node in the blockchain network, then after acquiring the data verification transaction request initiated by the data owner, the node in the blockchain network may notify the data verification transaction request of the data owner to the data storer, and the data storer determines whether to respond to the data verification transaction request of the data owner. Optionally, the data storer that decides to respond to the data verification transaction request of the data owner may give feedback to the node in the blockchain network so that the node in the blockchain network can acquire the response signature value of the response made by the data storer to the data verification transaction request.

In another embodiment, if the data storer is a node in the blockchain network, the data storer may also acquire the data verification transaction request initiated by the data owner from the blockchain network. In this case, the data storer may decide whether to respond to the data verification transaction request of the data owner. Optionally, the data storer that decides to respond to the data verification transaction request of the data owner may give feedback to a blockchain generation node, that is, a local node, so that the local node can acquire the response signature value of the response made by the data storer to the data verification transaction request.

In S702, it is verified, according to the data verification transaction request and the response signature value and based on a bilinear mapping between a first point group and a second point group, whether a to-be-verified data block is stored in the data storer.

Whether a to-be-verified data block is stored in the data storer may be verified based on the bilinear mapping between the first point group and the second point group and according to the current verification round in the data verification transaction request, the auxiliary verification value corresponding to the current verification round, identification information of the to-be-verified data block corresponding to the current verification round, the validity check value of the to-be-verified data block corresponding to the current verification round, the response signature value corresponding to the current verification round, and the public key of the data owner.

The response signature value and the public key of the data owner belong to different point groups. Optionally, the response signature value belongs to the first point group and may be generated based on the base point in the first point group, and the public key of the data owner belongs to the second point group. Illustratively, the public key of the data owner is determined based on the private key of the data owner and the base point in the second point group. The base point in the first point group is a generator of the first point group. Other points in the first point group may be generated based on the base point. The base point in the second point group is a generator of the second point group. Other points in the second point group may be generated based on the base point.

Further, when the response signature value belongs to the first point group, and the public key of the data owner belongs to the second point group, the validity check value is less than the order of the first point group. The order of the first point group refers to the total number of points in the first point group.

In an alternative embodiment, the current verification round in the data verification transaction request, the auxiliary verification value corresponding to the current verification round, identification information of the to-be-verified data block corresponding to the current verification round, the validity check value of the to-be-verified data block corresponding to the current verification round, the response signature value corresponding to the current verification round, and the public key of the data owner may be input to a bilinear verification model based on the bilinear mapping between the first point group and the second point group so that whether a to-be-verified data block is stored in the data storer can be verified.

In another alternative embodiment, according to a smart lease contract, whether a to-be-verified data block is stored in the data storer may be verified based on the bilinear mapping between the first point group and the second point group and according to the current verification round in the data verification transaction request, the auxiliary verification value corresponding to the current verification round, identification information of the to-be-verified data block corresponding to the current verification round, the validity check value of the to-be-verified data block corresponding to the current verification round, the response signature value corresponding to the current verification round, and the public key of the data owner.

In another alternative embodiment, whether a to-be-verified data block is stored in the data storer may be verified based on the bilinear mapping between the first point group and the second point group and according to the current verification round in the data verification transaction request, the auxiliary verification value corresponding to the current verification round, identification information of the to-be-verified data block corresponding to the current verification round, the validity check value of the to-be-verified data block corresponding to the current verification round, the response signature value corresponding to the current verification round, the public key of the data owner, and the base point in the second point group.

For example, the current verification round in the data verification transaction request, the auxiliary verification value corresponding to the current verification round, identification information of the to-be-verified data block corresponding to the current verification round, the validity check value of the to-be-verified data block corresponding to the current verification round, the response signature value corresponding to the current verification round, the public key of the data owner, and the base point in the second point group may be input to the bilinear verification model based on the bilinear mapping between the first point group and the second point group so that whether a to-be-verified data block is stored in the data storer can be verified.

For example, the current verification round in the data verification transaction request, the auxiliary verification value corresponding to the current verification round, identification information of the to-be-verified data block corresponding to the current verification round, the validity check value of the to-be-verified data block corresponding to the current verification round, the response signature value corresponding to the current verification round, the public key of the data owner, and the base point in the second point group may be input into a formula constructed based on the bilinear mapping between the first point group and the second point group so that the formula is workable is verified, and thus whether a to-be-verified data block is stored in the data storer can be verified.

It is to be understood that in this embodiment, whether a to-be-verified data block is stored in the data storer is verified based on the bilinear mapping and according to various data including the identification information, the validity check value, the response signature value, the auxiliary signature value, the public key of the data owner, and the base point in the second point group so that the accuracy of the verification result is improved.

The solution according to this embodiment of the present disclosure includes acquiring, in response to the data verification transaction request initiated by the data owner, the response signature value of the response made by the data storer to the data verification transaction request; and verifying, based on the bilinear mapping between the first point group and the second point group and according to the data verification transaction request and the response signature value, whether a to-be-verified data block is stored in the data storer. In this solution, the bilinear mapping is introduced so that whether data of the data owner is actually stored in the data storer can be effectively verified in the case where no data requires to be provided and regardless of whether or not the size of the to-be-verified data block exceeds the order of the first point group.

Based on the previous embodiment, in an alternative embodiment of the present disclosure, verifying, based on the bilinear mapping between the first point group and the second point group and according to the data verification transaction request and the response signature value, whether a to-be-verified data block is stored in the data storer includes determining a first point value in a third point group based on the bilinear mapping between the first point group and the second point group and according to identification information of the to-be-verified data block corresponding to the current verification round, the validity check value of the to-be-verified data block corresponding to the current verification round, the auxiliary signature value corresponding to the current verification round, the public key of the data owner, and the first signature value in the response signature value; determining a second point value of the third point group based on the bilinear mapping between the first point group and the second point group and according to the second signature value in the response signature value and the base point in the second point group; and verifying, according to the first point value and the second point value, whether a to-be-verified data block is stored in the data storer.

The first point value of the third point group is the value of a point in the third point group. This point is obtained based on a point in the first point group and a point in the second point group based on the bilinear mapping between the first point group and the second point group.

First, the first point value of the third point group is determined based on the bilinear mapping between the first point group and the second point group and according to identification information of the to-be-verified data block corresponding to the current verification round, the validity check value of the to-be-verified data block corresponding to the current verification round, the auxiliary signature value corresponding to the current verification round, the public key of the data owner, and the first signature value in the response signature value.

For example, a point in the first point group may be determined based on the validity check value corresponding to the current verification round, the identification information corresponding to the current verification round, the auxiliary signature value corresponding to the current verification round, the first signature value in the response signature value corresponding to the current verification round by using a set formula; the public key of the data owner may be used as a point in the second point group; and then the first point value of the third point group may be determined based on the bilinear mapping between the first point group and the second point group.

Alternatively, the first point value of the third point group may be determined based on the processing logic in the smart lease contract, based on the bilinear mapping between the first point group and the second point group and according to the identification information, the validity check value, the auxiliary signature value, the public key of the data owner, and the first signature value in the response signature value.

The determination manner below is used.

In the first step, the first value is determined based on the validity check value corresponding to the current verification round, the identification information corresponding to the current verification round, and the first auxiliary value in the auxiliary signature value corresponding to the current verification round.

In an embodiment, the sum of the validity check value, the identification information, and the first auxiliary value in the auxiliary signature value may be used as the first value. Alternatively, the product of the validity check value, the identification information, and the first auxiliary value in the auxiliary signature value may be used as the first value.

In another embodiment, a hash operation may be performed on the identification information and the first auxiliary value in the auxiliary signature value so that a hash value is obtained; and the first value may be determined based on the hash value and the validity check value. For example, a hash operation may be performed, using a unique hash function, on the identification information and the first auxiliary value in the auxiliary signature value so that a hash value is obtained; and the first value may be determined based on the hash value and the validity check value. The unique hash function may be used for coding of a content segment into a point.

Further, when there are multiple to-be-verified data blocks, each to-be-verified data block has one piece of identification information and corresponds to one validity check value. Further, for each to-be-verified data block, a hash operation is performed on identification information of the each to-be-verified data block and the first auxiliary value in the auxiliary signature value so that a hash value is obtained, and the product of the hash value and the validity check value associated with the each to-be-verified data block is used as the first value corresponding to the each to-be-verified data block. Then, the sum of first values corresponding to all to-be-verified data blocks is used as the final first value.

It is to be understood that the hash coding enables the identification information and the first auxiliary value to be converted into a point value, reducing the complexity of calculation, laying a foundation for subsequent determination of the first point value of the third point group based on the mapping between the first point group and the second point group.

In the second step, the second value is determined based on the second auxiliary value in the auxiliary signature value and the first signature value in the response signature value.

In an embodiment, the sum of the second auxiliary value in the auxiliary signature value and the first signature value in the response signature value may be used as the second value.

In another embodiment, the product of the second auxiliary value in the auxiliary signature value and the first signature value in the response signature value may be used as the second value.

In the third step, a third value is determined based on the first value and the second value.

Illustratively, the product of the first value and the second value may be used as the third value.

Illustratively, the sum of the first value and the second value may be used as the third value. The third value belongs to the first point group.

In the fourth step, the first point value of the third point group is determined based on the bilinear mapping between the first point group and the second point group and according to the third value and the public key of the data owner.

In this embodiment, the first point value of the third point group may be determined in the following manner: Based on the bilinear mapping, that is, the mapping function, between the first point group and the second point group, the third value is substituted at the position of the first point group in the mapping function, and the public key of the data owner is substituted at the position of the second point group in the mapping function.

After the first point value of the third point group is determined, the second point value of the third point group is obtained based on the bilinear mapping between the first point group and the second point group and according to the second signature value in the response signature value and the base point in the second point group.

The second point value of the third point group may be determined in the following manner: Based on the bilinear mapping, that is, the mapping function, between the first point group and the second point group, the second signature value in the response signature value is substituted at the position of the first point group in the mapping function, and the base point in the second point group is substituted at the position of the second point group in the mapping function.

After the first point value of the third point group and the second point value of the third point group, whether a to-be-verified data block is stored in the data storer is verified according to the first point value and the second point value.

If the first point value is equal to the second point value, it indicates that a to-be-verified data block is stored in the data storer. If the first point value is not equal to the second point value, it indicates that no to-be-verified data block is stored in the data storer, or no complete to-be-verified data block is stored in the data storer.

Based on any previous embodiment, in an alternative embodiment of the present disclosure, whether file data of the data owner is stored in the data storer may be determined according to the verification result of verification of whether a to-be-verified data block is stored in the data storer.

Illustratively, if the verification result is that a to-be-verified data block of the data owner is stored in the data storer, it is determined that file data of the data owner is stored in the data storer, that is, all data blocks allocated by the data owner are stored in the data storer.

Illustratively, if the verification result is that no to-be-verified data block of the data owner is stored in the data storer, it is determined that no file data of the data owner is stored in the data storer.

It is to be understood that in this embodiment, in the scenario of verifying whether file data of the data owner is stored in the data storer, not all of the data blocks allocated to the data storer by the data owner require to be verified, and only part of these allocated data blocks require to be verified, that is, only a to-be-verified data block requires to be verified. This method improves the verification efficiency and serves as a solution to verification of whether file data of the data owner is actually stored in the data storer.

Figure 8:
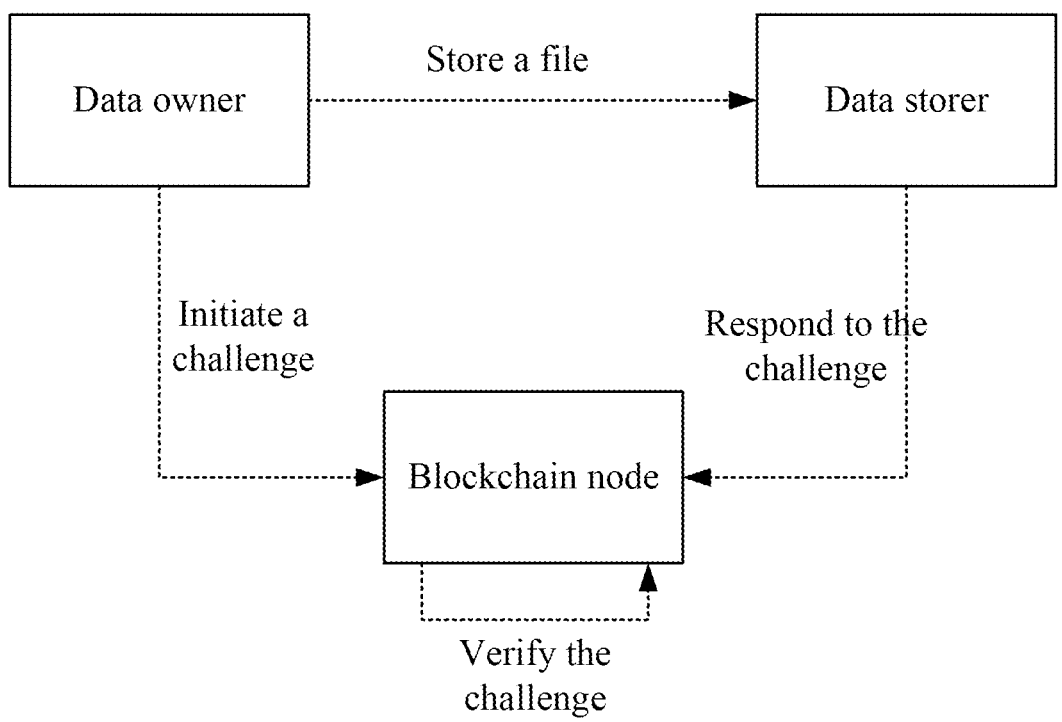
FIG. 8 is a diagram of an implementation process of a blockchain-based data verification according to an embodiment of the present disclosure.

FIG. 8 is a diagram of an implementation process of a blockchain-based data verification according to an embodiment of the present disclosure. This embodiment is a solution based on the preceding embodiments. As shown in FIG. 8, the blockchain-based data verification process according to this embodiment is described as below.

When storing the target file, the data owner splits the target file into N associated data blocks, where N is a natural number greater than 1; generates a uniform auxiliary signature value for all associated data blocks; and generates an auxiliary verification value for each associated data in each verification round. Then, the data owner generates a unique data signature value for each associated data block in each verification round based on the auxiliary verification value, the auxiliary signature value, the private key of the data owner, data information of the data block, and the base point in the first point group; and then allocates associated data blocks and data signature values of the associated data blocks to one or more data storers so that the one or more data storers can store the associated data blocks and data signature values of the associated data blocks, that is, the one or more data storers can store the file.

Meanwhile, the data owner sends a data storage transaction request including the auxiliary signature value and the public key of the data owner to the blockchain network so that the blockchain network can associate the local public key with the local auxiliary signature value and store the local public key and the local auxiliary signature value.

When requiring verification of whether data of the data owner is actually stored in the data storer, the data owner selects a to-be-verified data block from data blocks of the target file that has been allocated to the data storer, generates the validity check value of the to-be-verified data block, and initiates a data verification transaction request to the blockchain network, that is, initiates a challenge to the blockchain network.

After acquiring the data verification transaction request initiated by the data owner, the data storer acquires, according to the identification information, the data content and data signature value of the to-be-verified data block corresponding to the verification round from the locally stored file data; generates a response signature value; and sends the response signature value to the blockchain network, that is, responds to the challenge.

In response to the data verification transaction request initiated by the data owner and including the identification information and validity check value of the to-be-verified data block, the blockchain node acquires the response signature value of the response made by the data storer to the data verification transaction request. Then the blockchain node verifies whether a to-be-verified data block is stored in the data storer, that is, verifies the challenge, according to the smart lease contract, based on the bilinear mapping between the first point group and the second point group, and according to the current verification round, and the auxiliary signature value, the auxiliary verification value, the base point in the second point group, the public key of the data owner, the response signature value, the validity check value and the identification information corresponding to the current verification round.

The challenge is a manner in which the data owner determines whether data of the data owner is actually stored in the data storer. The challenge may take various forms, for example, a transaction request. For example, the challenge may be a data verification transaction request.

Figure 9:
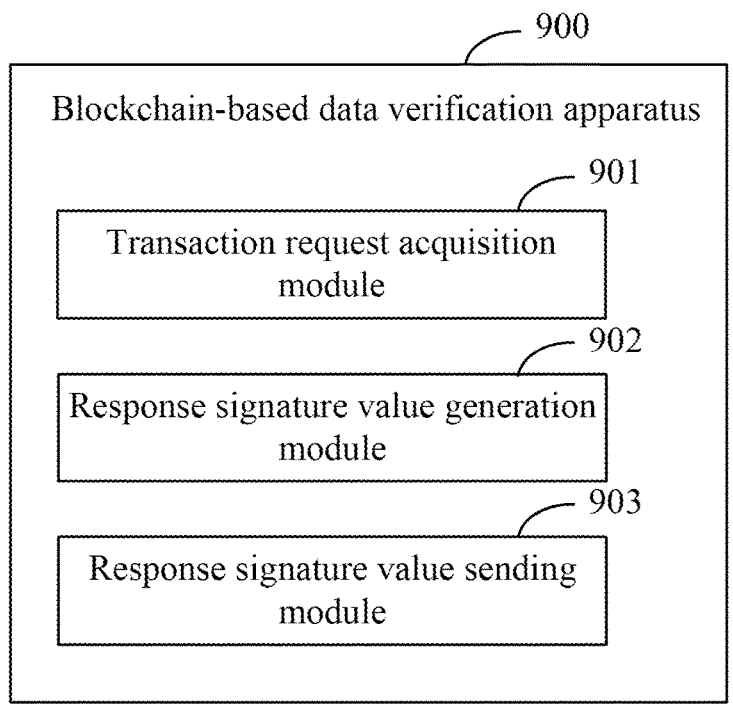
FIG. 9 is a diagram illustrating the structure of a blockchain-based data verification apparatus according to an embodiment of the present disclosure.

FIG. 9 is a diagram illustrating the structure of a blockchain-based data verification apparatus according to an embodiment of the present disclosure. This embodiment of the present disclosure is applicable to the case where data is verified based on the blockchain technology, for example, applicable to how to verify whether data of a data owner is stored in a data storer based on a bilinear mapping between a first point group and a second point group when the data owner has allocated at least two data blocks of a file to the data storer. The blockchain-based data verification method is performed under the cooperation between the data owner, the data storer, and a node in a blockchain network. The data owner is one that stores data of the data owner in the data storer. The data storer is one that has rich storage resources for storing data. Further, the node in the blockchain network can interact with the data owner and the data storer.

The blockchain-based data verification method according to this embodiment may be performed by the data storer. Optionally, the data storer may be a node in the blockchain network or may not be a node in the blockchain network. The apparatus may be implemented in software and/or hardware and may be integrated in a computing device of the data storer. As shown in FIG. 9, the blockchain-based data verification apparatus 900 according to this embodiment may include a transaction request acquisition module 901, a response signature value generation module 902, and a response signature value sending module 903.

The transaction request acquisition module 901 is configured to acquire a data verification transaction request initiated by a data owner. The data verification transaction request includes the current verification round, an auxiliary verification value corresponding to the current verification round, identification information of a to-be-verified data block corresponding to the current verification round, and a validity check value of the to-be-verified data block corresponding to the current verification round.

The response signature value generation module 902 is configured to generate a response signature value in the current verification round according to the data verification transaction request.

The response signature value sending module 903 is configured to send the response signature value to a blockchain network. The response signature value is configured to instruct the blockchain network to verify whether a to-be-verified data block is stored in a data storer.

The solution according to this embodiment of the present disclosure includes acquiring a data verification transaction request initiated by a data owner; generating a response signature value according to the data verification transaction request; and sending the response signature value to a blockchain network. The data verification transaction request includes the current verification round, an auxiliary verification value corresponding to the current verification round, identification information of the to-be-verified data block corresponding to the current verification round, and a validity check value of the to-be-verified data block corresponding to the current verification round. The response signature value is configured to instruct the blockchain network to verify whether a to-be-verified data block is stored in the data storer. In this solution, a more valid response signature value can be generated according to a verification round and an auxiliary verification value corresponding to the verification round in a scenario of verification based on a bilinear mapping thereby ensuring that the verification result is reliable. Moreover, this solution enables an accurate verification of whether data of the data owner is actually stored in the data storer in the case where no data requires to be provided.

Further, the response signature value generation module 902 includes a data content acquisition unit, a processing result determination unit, and a response signature value generation unit.

The data content acquisition unit is configured to acquire data content of the to-be-verified data block from locally stored file data according to the identification information.

The processing result determination unit is configured to compress the data content according to the auxiliary verification value to obtain a processing result.

The response signature value generation unit is configured to generate the response signature value in the current verification round based on the processing result, the current verification round, and the validity check value.

Further, the processing result determination unit is configured to perform a hash operation on the data content and the auxiliary verification value to obtain a first hash value; and determine the processing result according to the first hash value.

Further, the response signature value generation unit includes a data signature value determination subunit and a response signature value generation subunit.

The data signature value determination subunit is configured to acquire data content of the to-be-verified data block and a data signature value of the to-be-verified data block in the current verification round according to the current verification round.

The response signature value generation subunit is configured to generate the response signature value based on the processing result, the data signature value, a base point in a first point group, and the validity check value.

Further, the response signature value generation subunit is configured to generate a first signature value in the response signature value in the current verification round based on the validity check value, the processing result, and the base point in the first point group; and generate a second signature value in the response signature value in the current verification round based on the data signature value and the validity check value.

Further, the data content acquisition unit is configured to determine the start position of file data to which the to-be-verified data block belongs; determine the initial position of the to-be-verified data block according to the identification information, a data offset, and the start position; and acquire the data content of the to-be-verified data block from the locally stored file data according to the initial position.

Figure 10:
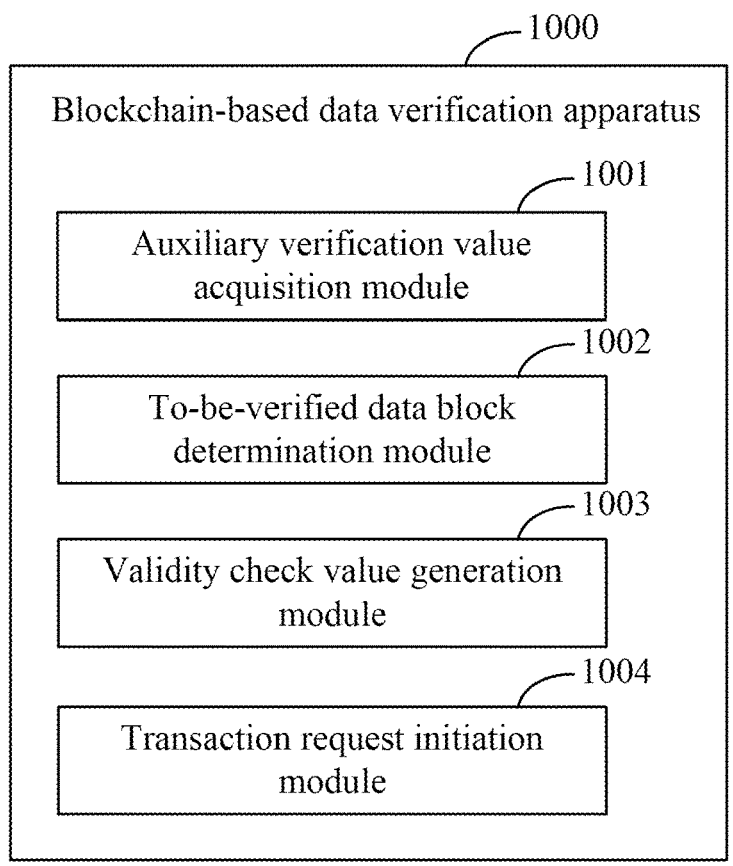
FIG. 10 is a diagram illustrating the structure of another blockchain-based data verification apparatus according to an embodiment of the present disclosure.

FIG. 10 is a diagram illustrating the structure of another blockchain-based data verification apparatus according to an embodiment of the present disclosure. This embodiment of the present disclosure is applicable to the case where data is verified based on the blockchain technology, for example, applicable to how to verify whether data of a data owner is stored in a data storer. The blockchain-based data verification method is performed under the cooperation between the data owner, the data storer, and nodes in a blockchain network.

The blockchain-based data verification method according to this embodiment may be performed by a node in the blockchain network, for example, a block generation node in the blockchain network. The method may be performed by a blockchain-based data verification apparatus. The apparatus may be implemented in software and/or hardware and may be integrated in a computing device of a blockchain node carrying a blockchain-based data verification function. As shown in FIG. 10, the blockchain-based data verification apparatus 1000 according to this embodiment may include an auxiliary verification value acquisition module 1001, a to-be-verified data block determination module 1002, a validity check value generation module 1003, and a transaction request initiation module 1004.

The auxiliary verification value acquisition module 1001 is configured to, in response to determining that data verification is required, acquire an auxiliary verification value corresponding to the current verification round.

The to-be-verified data block determination module 1002 is configured to select the to-be-verified data block corresponding to the current verification round from associated data blocks of a target file allocated to a data storer.

The validity check value generation module 1003 is configured to generate a validity check value of the to-be-verified data block.

The transaction request initiation module 1004 is configured to initiate a data verification transaction request to a blockchain network. The data verification transaction request is configured to instruct the blockchain network to verify whether a to-be-verified data block is stored in the data storer. The data verification transaction request includes the current verification round, the auxiliary verification value corresponding to the current verification round, identification information of the to-be-verified data block corresponding to the current verification round, and the validity check value of the to-be-verified data block corresponding to the current verification round.

The solution according to this embodiment of the present disclosure includes, in response to determining that data verification is required, acquiring an auxiliary verification value corresponding to the current verification round; selecting the to-be-verified data block corresponding to the current verification round from associated data blocks of a target file allocated to a data storer; generating a validity check value of the to-be-verified data block; and initiating a data verification transaction request to a blockchain network. In this solution, when it is required to verify whether data is stored in the data storer, the data owner can perform verification based on the blockchain network after providing the blockchain network with only the auxiliary verification value corresponding to the current verification round, identification information of the to-be-verified data block corresponding to the current verification round, and the validity check value of the to-be-verified data block corresponding to the current verification round without providing the to-be-verified data block, ensuring the data privacy and ensuring an effective verification of whether data is stored in the data storer, regardless of whether or not the size of the to-be-verified data block exceeds the order of a first point group.

Further, the auxiliary verification value acquisition module 1001 is configured to generate the auxiliary verification value corresponding to the current verification round based on the current verification round, a private key of the data owner, and a base point in the first point group.

Further, the apparatus also includes a data signature value generation module configured to generate data signature values of the associated data blocks in the current verification round based on the auxiliary verification value corresponding to the current verification round, an auxiliary signature value, data information of the associated data blocks, the private key of the data owner, and the base point in the first point group.

Further, the data signature value generation module includes a first value generation unit, a second value generation unit, and a data signature value generation unit.

The first value generation unit is configured to generate a first value based on a first auxiliary value in the auxiliary signature value and identification information in the data information of the associated data blocks.

The second value generation unit is configured to generate a second value based on data content in the data information, a second auxiliary value in the auxiliary signature value, the auxiliary verification value corresponding to the current verification round, and the base point in the first point group.

The data signature value generation unit is configured to generate the data signature values of the associated data blocks in the current verification round based on the private key of the data owner, the first value, and the second value.

Further, the second value generation unit is configured to perform a hash operation on the auxiliary verification value corresponding to the current verification round and the data content in the data information to obtain a second hash value; and generate the second value based on the second hash value, the second auxiliary value in the auxiliary signature value, and the base point in the first point group.

Further, the apparatus also includes a data allocation module configured to allocate the associated data block and a data signature set of the associated data block to the data storer. The data signature set includes data signature values of the associated data block in all verification rounds.

Operations, including acquisition, storage and application, on data of the data storer and data of the data owner involved in the solution of the present disclosure conform to relevant laws and regulations and do not violate the public policy doctrine.

According to an embodiment of the present disclosure, the present disclosure also provides an electronic device, a readable storage medium and a computer program product.

Figure 11:
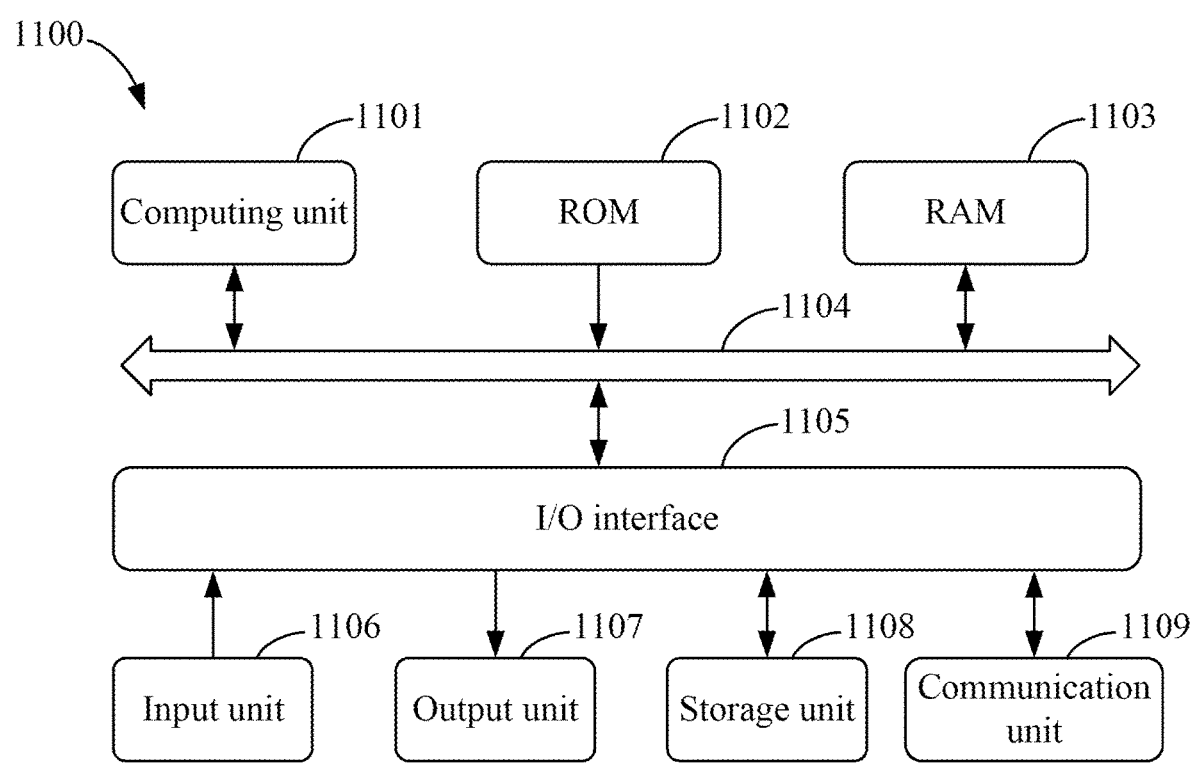
FIG. 11 is a block diagram of an electronic device for performing a blockchain-based data verification method of an embodiment of the present disclosure.

FIG. 11 is a block diagram of an electronic device for performing a blockchain-based data verification method of an embodiment of the present disclosure. FIG. 11 is a block diagram of an example electronic device 1100 that may be configured to implement an embodiment of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 11, the electronic device 1100 includes a computing unit 1101. The computing unit 1101 may perform various appropriate actions and processing according to a computer program stored in a read-only memory (ROM) 1102 or a computer program loaded into a random-access memory (RAM) 1103 from a storage unit 1108. Various programs and data required for the operation of the electronic device 1100 are also stored in the RAM 1103. The computing unit 1101, the ROM 1102, and the RAM 1103 are connected to each other through a bus 1104. An input/output (I/O) interface 1105 is also connected to the bus 1104.

Multiple components in the electronic device 1100 are connected to the I/O interface 1105. The multiple components include an input unit 1106 such as a keyboard or a mouse, an output unit 1107 such as various types of displays or speakers, the storage unit 1108 such as a magnetic disk or an optical disk, and a communication unit 1109 such as a network card, a modem or a wireless communication transceiver. The communication unit 1109 allows the electronic device 1100 to exchange information/data with other devices over a computer network such as the Internet and/or various telecommunications networks.

The computing unit 1101 may be various general-purpose and/or special-purpose processing components having processing and computing capabilities. Examples of the computing unit 1101 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller and microcontroller. The computing unit 1101 executes various preceding methods and processing, such as the blockchain-based data verification method. For example, in some embodiments, the blockchain-based data verification method may be implemented as a computer software program tangibly contained in a machine-readable medium such as the storage unit 1108. In some embodiments, part or all of computer programs may be loaded and/or installed onto the electronic device 1100 via the ROM 1102 and/or the communication unit 1109. When the computer program is loaded onto the RAM 1103 and executed by the computing unit 1101, one or more steps of the preceding blockchain-based data verification method may be executed. Alternatively, in other embodiments, the computing unit 1101 may be configured, in any other suitable manner (for example, by use of firmware), to execute the blockchain-based data verification method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

Artificial intelligence is the study of making computers simulate certain human thinking processes and intelligent behaviors (such as learning, reasoning, thinking and planning) both at the hardware and software levels. Artificial intelligence hardware technologies generally include technologies such as sensors, special-purpose artificial intelligence chips, cloud computing, distributed storage and big data processing. Artificial intelligence software technologies mainly include several major technologies such as computer vision technologies, speech recognition technologies, natural language processing technologies, machine learning/deep learning technologies, big data processing technologies and knowledge mapping technologies.

Cloud computing refers to a technical system that accesses a shared elastic-and-scalable physical or virtual resource pool through a network, where resources may include servers, operating systems, networks, software, applications and storage devices and may be deployed and managed in an on-demand, self-service manner. Cloud computing can provide efficient and powerful data processing capabilities for artificial intelligence, the blockchain and other technical applications and model training.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A blockchain-based data verification method, comprising:
   acquiring a data verification transaction request initiated by a data owner, wherein the data verification transaction request comprises a current verification round, an auxiliary verification value corresponding to the current verification round, identification information of a to-be-verified data block corresponding to the current verification round, and a validity check value of the to-be-verified data block corresponding to the current verification round;
   generating a response signature value in the current verification round according to the data verification transaction request, wherein generating the response signature value in the current verification round according to the data verification transaction request comprises:
      acquiring data content of the to-be-verified data block from locally stored file data according to the identification information,
      compressing the data content according to the auxiliary verification value to obtain a processing result, and
      generating the response signature value in the current verification round based on the processing result, the current verification round, and the validity check value; and
   sending the response signature value to a blockchain network, wherein the response signature value is configured to instruct the blockchain network to verify whether the to-be-verified data block is stored in a data storer based on a bilinear mapping between a first point group and a second point group and according to the current verification round, the identification information of the to-be-verified data block corresponding to the current verification round, the validity check value of the to-be-verified data block corresponding to the current verification round, the response signature value corresponding to the current verification round, and a public key of the data owner corresponding to the current verification round, wherein the response signature value belongs to the first point group, and the public key of the data owner belongs to the second point group.

2. The method of claim 1, wherein compressing the data content according to the auxiliary verification value to obtain the processing result comprises:
   performing a hash operation on the data content and the auxiliary verification value to obtain a first hash value; and
   determining the processing result according to the first hash value.

3. The method of claim 1, wherein generating the response signature value in the current verification round based on the processing result, the current verification round, and the validity check value comprises:
   acquiring a data signature value of the to-be-verified data block in the current verification round according to the current verification round; and
   generating the response signature value in the current verification round based on the processing result, the data signature value, a base point in the first point group, and the validity check value.

4. The method of claim 3, wherein generating the response signature value in the current verification round based on the processing result, the data signature value, the base point in the first point group, and the validity check value comprises:
   generating a first signature value in the response signature value in the current verification round based on the validity check value, the processing result, and the base point in the first point group; and
   generating a second signature value in the response signature value in the current verification round based on the data signature value and the validity check value.

5. The method of claim 1, wherein acquiring the data content of the to-be-verified data block from the locally stored file data according to the identification information comprises:
   determining a start position of file data to which the to-be-verified data block belongs;
   determining an initial position of the to-be-verified data block according to the identification information, a data offset, and the start position; and
   acquiring the data content of the to-be-verified data block from the locally stored file data according to the initial position.

6. A blockchain-based data verification method, comprising:
   in response to determining that data verification is required, acquiring an auxiliary verification value corresponding to a current verification round;
   selecting a to-be-verified data block corresponding to the current verification round from associated data blocks of a target file allocated to a data storer;
   generating a validity check value of the to-be-verified data block; and
   initiating a data verification transaction request to a blockchain network, wherein the data verification transaction request is configured to instruct the blockchain network to verify, based on a bilinear mapping between a first point group and a second point group and according to the data verification transaction request and a response signature value of the data storer for responding to the data verification transaction request, whether the to-be-verified data block is stored in the data storer, and the data verification transaction request comprises the current verification round, the auxiliary verification value corresponding to the current verification round, identification information of the to-be-verified data block corresponding to the current verification round, and the validity check value of the to-be-verified data block corresponding to the current verification round, wherein the response signature value belongs to the first point group, and a public key of the data owner belongs to the second point group.

7. The method of claim 6, wherein acquiring the auxiliary verification value corresponding to the current verification round comprises:
   generating the auxiliary verification value corresponding to the current verification round based on the current verification round, a private key of a data owner, and a base point in the first point group.

8. The method of claim 6, further comprising:
generating a data signature value of an associated data block of the associated data blocks in the current verification round based on the auxiliary verification value corresponding to the current verification round, an auxiliary signature value corresponding to the current verification round, data information of the associated data block corresponding to the current verification round, a private key of a data owner corresponding to the current verification round, and a base point in a first point group corresponding to the current verification round.

9. The method of claim 8, wherein generating the data signature value of the associated data block in the current verification round based on the auxiliary verification value corresponding to the current verification round, the auxiliary signature value corresponding to the current verification round, the data information of the associated data block corresponding to the current verification round, the private key of the data owner, and the base point in the first point group comprises:
generating a first value based on a first auxiliary value in the auxiliary signature value and identification information in the data information of the associated data block;
generating a second value based on data content in the data information, a second auxiliary value in the auxiliary signature value, the auxiliary verification value corresponding to the current verification round, and the base point in the first point group; and
generating the data signature value of the associated data block in the current verification round based on the private key of the data owner, the first value, and the second value.

10. The method of claim 9, wherein generating the second value based on the data content in the data information, the second auxiliary value in the auxiliary signature value, the auxiliary verification value corresponding to the current verification round, and the base point in the first point group comprises:
performing a hash operation on the auxiliary verification value corresponding to the current verification round and the data content in the data information to obtain a second hash value; and
generating the second value based on the second hash value, the second auxiliary value in the auxiliary signature value, and the base point in the first point group.

11. The method of claim 8, further comprising:
allocating the associated data block and a data signature set of the associated data block to the data storer, wherein the data signature set comprises data signature values of the associated data block in all verification rounds.

12. An electronic device, comprising:
at least one processor; and
a memory communicatively connected to the at least one processor,
wherein the memory stores instructions executable by the at least one processor to enable the at least one processor to perform the following steps:
acquiring a data verification transaction request initiated by a data owner, wherein the data verification transaction request comprises a current verification round, an auxiliary verification value corresponding to the current verification round, identification information of a to-be-verified data block corresponding to the current verification round, and a validity check value of the to-be-verified data block corresponding to the current verification round;
generating a response signature value in the current verification round according to the data verification transaction request, wherein generating the response signature value in the current verification round according to the data verification transaction request comprises:
acquiring data content of the to-be-verified data block from locally stored file data according to the identification information,
compressing the data content according to the auxiliary verification value to obtain a processing result, and
generating the response signature value in the current verification round based on the processing result, the current verification round, and the validity check value;
sending the response signature value to a blockchain network, wherein the response signature value is configured to instruct the blockchain network to verify whether the to-be-verified data block is stored in a data storer.

13. The device of claim 12, wherein compressing the data content according to the auxiliary verification value to obtain the processing result comprises:
performing a hash operation on the data content and the auxiliary verification value to obtain a first hash value; and
determining the processing result according to the first hash value.

14. The device of claim 12, wherein generating the response signature value in the current verification round based on the processing result, the current verification round, and the validity check value comprises:
acquiring a data signature value of the to-be-verified data block in the current verification round according to the current verification round; and
generating the response signature value in the current verification round based on the processing result, the data signature value, a base point in a first point group, and the validity check value.

15. The device of claim 14, wherein generating the response signature value in the current verification round based on the processing result, the data signature value, the base point in the first point group, and the validity check value comprises:
generating a first signature value in the response signature value in the current verification round based on the validity check value, the processing result, and the base point in the first point group; and
generating a second signature value in the response signature value in the current verification round based on the data signature value and the validity check value.

16. A non-transitory computer-readable storage medium storing computer instructions when executed on a computer to perform the blockchain-based data verification method of claim 1.

17. An electronic device, comprising:
at least one processor; and
a memory communicatively connected to the at least one processor,
wherein the memory stores instructions executable by the at least one processor when executed on the at least one processor to perform the blockchain-based data verification method of claim 6.

18. A non-transitory computer-readable storage medium storing computer instructions when executed on a computer to perform the blockchain-based data verification method of claim 6.

\* \* \* \* \*